(12) United States Patent
Thompson et al.

(10) Patent No.: US 11,098,661 B2
(45) Date of Patent: Aug. 24, 2021

(54) METHODS AND SYSTEM FOR DETERMINING ENGINE SPEED

(71) Applicant: Ford Global Technologies, LLC, Dearborn, MI (US)

(72) Inventors: Scott Steadmon Thompson, Belleville, MI (US); Vincent Martinez, Royal Oak, MI (US); John Eric Rollinger, Troy, MI (US); David Lew, Canton, MI (US); Nicholas Herhusky, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 16/446,447

(22) Filed: Jun. 19, 2019

(65) Prior Publication Data
US 2020/0400084 A1  Dec. 24, 2020

(51) Int. Cl.
| *F02D 29/06* | (2006.01) |
|---|---|
| *F02D 28/00* | (2006.01) |
| *B60K 25/02* | (2006.01) |
| *F02D 41/02* | (2006.01) |
| *F02N 11/04* | (2006.01) |
| *B60K 25/00* | (2006.01) |
| *F02D 41/00* | (2006.01) |

(52) U.S. Cl.
CPC .............. *F02D 29/06* (2013.01); *B60K 25/02* (2013.01); *F02D 28/00* (2013.01); *F02D 41/021* (2013.01); *F02N 11/04* (2013.01); *B60K 2025/005* (2013.01); *B60K 2025/024* (2013.01); *B60W 2710/305* (2013.01); *B60Y 2400/604* (2013.01); *F02D 41/0097* (2013.01); *F02D 2200/70* (2013.01)

(58) Field of Classification Search
CPC .............. B60K 25/02; B60K 2025/005; B60K 2025/024; B60W 2710/305; B60Y 2400/604; F02D 28/00; F02D 29/06; F02D 41/0097; F02D 41/021; F02D 2200/70; F02N 11/04
See application file for complete search history.

(56) References Cited

U.S. PATENT DOCUMENTS

| 4,794,898 A | 1/1989 | Kato |
|---|---|---|
| 6,603,097 B2 | 8/2003 | Leisner et al. |
| 7,312,964 B2 | 12/2007 | Tchernobrivets |
| 2007/0141999 A1 | 6/2007 | Przywecki |

(Continued)

FOREIGN PATENT DOCUMENTS

WO  2008115471 A2  9/2008

OTHER PUBLICATIONS

Herhusky, N. et al., "Methods and Systems for Engine Idle Stop," U.S. Appl. No. 16/440,514, filed Jun. 13, 2019, 40 pages.

(Continued)

*Primary Examiner* — Hung Q Nguyen
*Assistant Examiner* — Mark L. Greene
(74) *Attorney, Agent, or Firm* — Geoffrey Brumbaugh; McCoy Russell LLP

(57) ABSTRACT

Systems and methods for operating a vehicle that includes an engine and an electric machine are described. In one example, a speed of the engine may be adjusted so that the engine provides power to drive the electric machine without generating numerous rapid engine speed changes in a short amount of time.

18 Claims, 6 Drawing Sheets

(56) References Cited

U.S. PATENT DOCUMENTS

2013/0106118 A1  5/2013  Koenen et al.
2015/0192632 A1  7/2015  Crosman, III et al.

OTHER PUBLICATIONS

Thompson, S. et al., "Methods and System for Operating an Electric Power Delivery Device of a Vehicle," U.S. Appl. No. 16/441,913, filed Jun. 14, 2019, 37 pages.
Herhusky, N. et al., "Methods and System for Reducing a Possibility of Spark Plug Fouling," U.S. Appl. No. 16/444,790, filed Jun. 18, 2019, 43 pages.
Thompson, S. et al., "Methods and Systems for In-Use Monitor Performance," U.S. Appl. No. 16/503,389, filed Jul. 3, 2019, 47 pages.
Herhusky, N. et al., "Method for Operating a Vehicle Having an Electrical Outlet," U.S. Appl. No. 16/562,287, 40 pages.

METHODS AND SYSTEM FOR DETERMINING ENGINE SPEED

FIELD

The present description relates to methods and a system for a vehicle that includes an electric machine for supplying electrical power to external power electrical power consumers.

BACKGROUND AND SUMMARY

A vehicle may include an electric machine that generates electrical power from power that is produced by an engine. In particular, the engine may rotate the electric machine and the electric machine may generate charge to supply to external electric power consumers. The output of the electric machine may be based on, or a function of, an amount of electric power that is consumed via external electric power consumers. The amount of electric power that is consumed by the external electric power consumers may vary over time. Sometimes, the amount of electrical power that is consumed by the external power consumers may be small and may be met by the engine rotating the electric machine at engine idle speed. Operating the engine at idle speed allows fuel consumption of the engine to be reduced. At other times, the amount of electrical power that is consumed by the external power consumers may be larger so that the engine may not generate sufficient power to meet the demands of the external power consumers while the engine is operating at idle speed. Therefore, engine speed may be increased to a higher speed so that the engine output may be increased to meet the demands of the external power consumers. However, if the engine speed is increased and decreased responsive to load changes generated by the external electric power consumers, then engine speed increases and decreases may be noticeable and objectionable to persons that may be proximate to the vehicle. Therefore, it may be desirable to provide a way of adjusting engine speed that allows electrical loads to be met while reducing a possibility of annoying persons that may be near the vehicle that is supplying electrical charge to the external electric power consumers.

The inventors herein have recognized the above-mentioned issues and have developed a powertrain operating method, comprising: propelling a vehicle via an engine; storing a plurality of requested instantaneous engine rotational speed values in a memory buffer via a controller, the memory buffer including a plurality of unique memory locations, each of the plurality of unique memory locations including one of the plurality of requested instantaneous engine rotational speed values; shifting at least one of the plurality of requested instantaneous engine rotational speed values from a first of the unique memory locations to a second of the unique memory locations in response to a buffer step time expiring; and adjusting engine rotational speed to a maximum requested instantaneous engine rotational speed value stored in the buffer via the controller.

By processing a plurality of requested instantaneous engine rotational speed values in a memory buffer of a controller, it may be possible to provide a requested amount of power to external electrical power consumers without engine speed having to repeatedly change in a short amount of time. Further, the memory buffer may allow the engine to operate at idle speed, a speed where peak engine power is produced, and at engine speeds between the idle speed and the speed where peak engine power is produced so that electric power generation efficiency may be improved. The memory buffer may have advantages over conventional first order low pass filters since it may respond faster to new buffer inputs that are greater than other buffer input. Further, the buffer may reduce the possibility of engine speed cycling that may be due to changes in electrical power consumer loads.

The present description may provide several advantages. In particular, the approach may improve reduce the possibility of rapid and numerous engine speed changes that may be related to electrical consumer electrical load changes. In addition, the approach may allow the engine to operate over a range of speeds so that engine efficiency may be improved for electrical loads that are less than a full rated electrical load. Further, the approach may include separate engine speed change rate limits for meeting electrical demands (e.g., increasing engine speeds) and reducing engine fuel consumption (e.g., decreasing engine speeds).

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
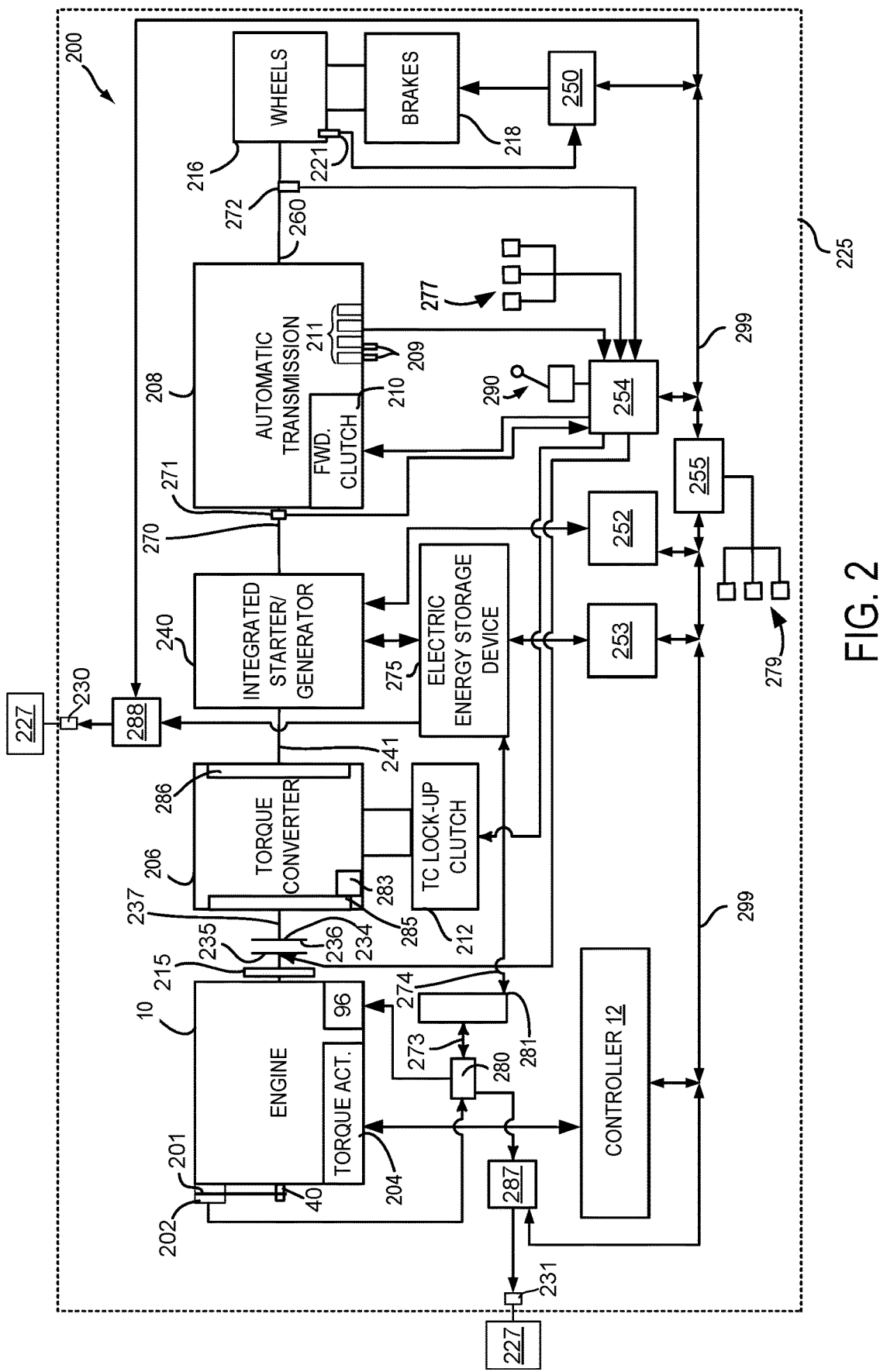
FIG. 2 is a schematic diagram of a vehicle driveline including example electrical power outputs.
Figure 3:
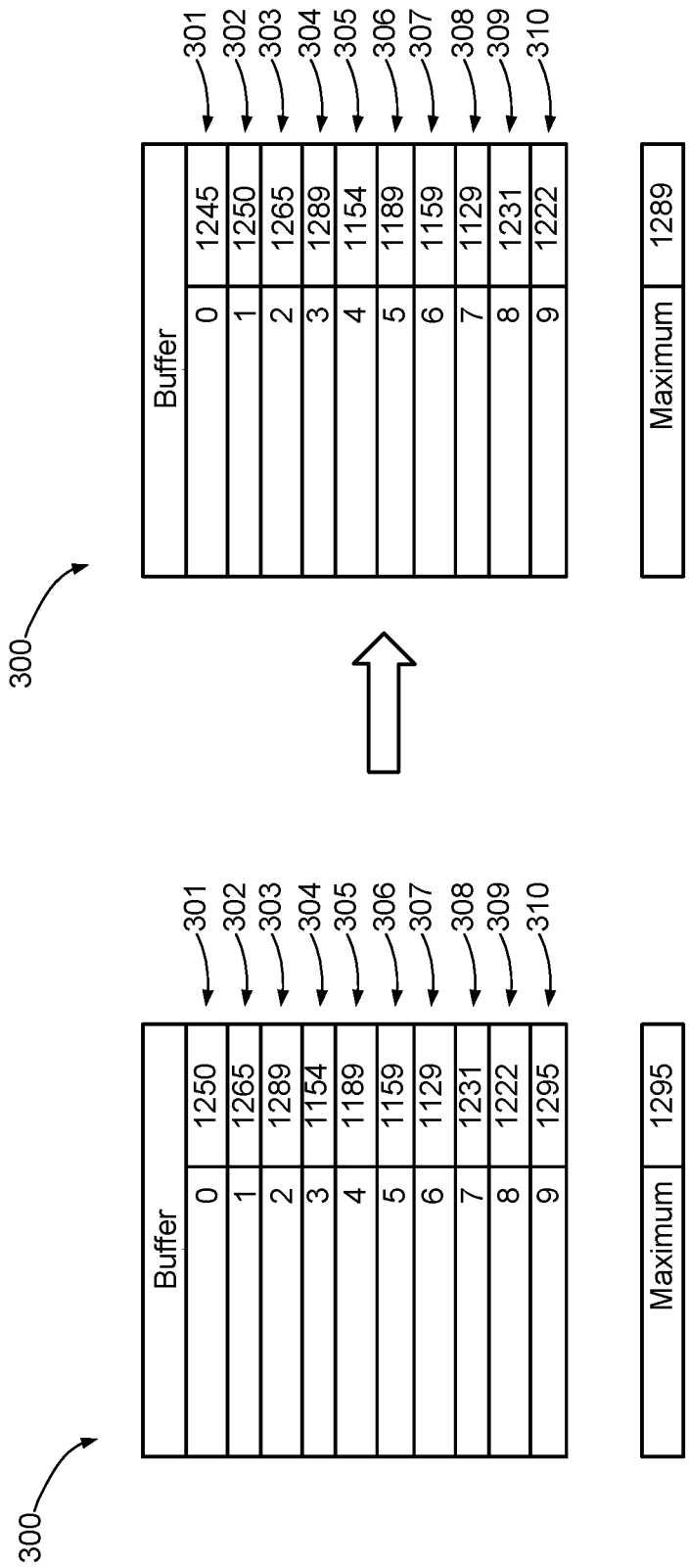
FIGS. 3A and 3B show an example memory buffer that holds a plurality of instantaneous engine speed requests.
Figure 4:
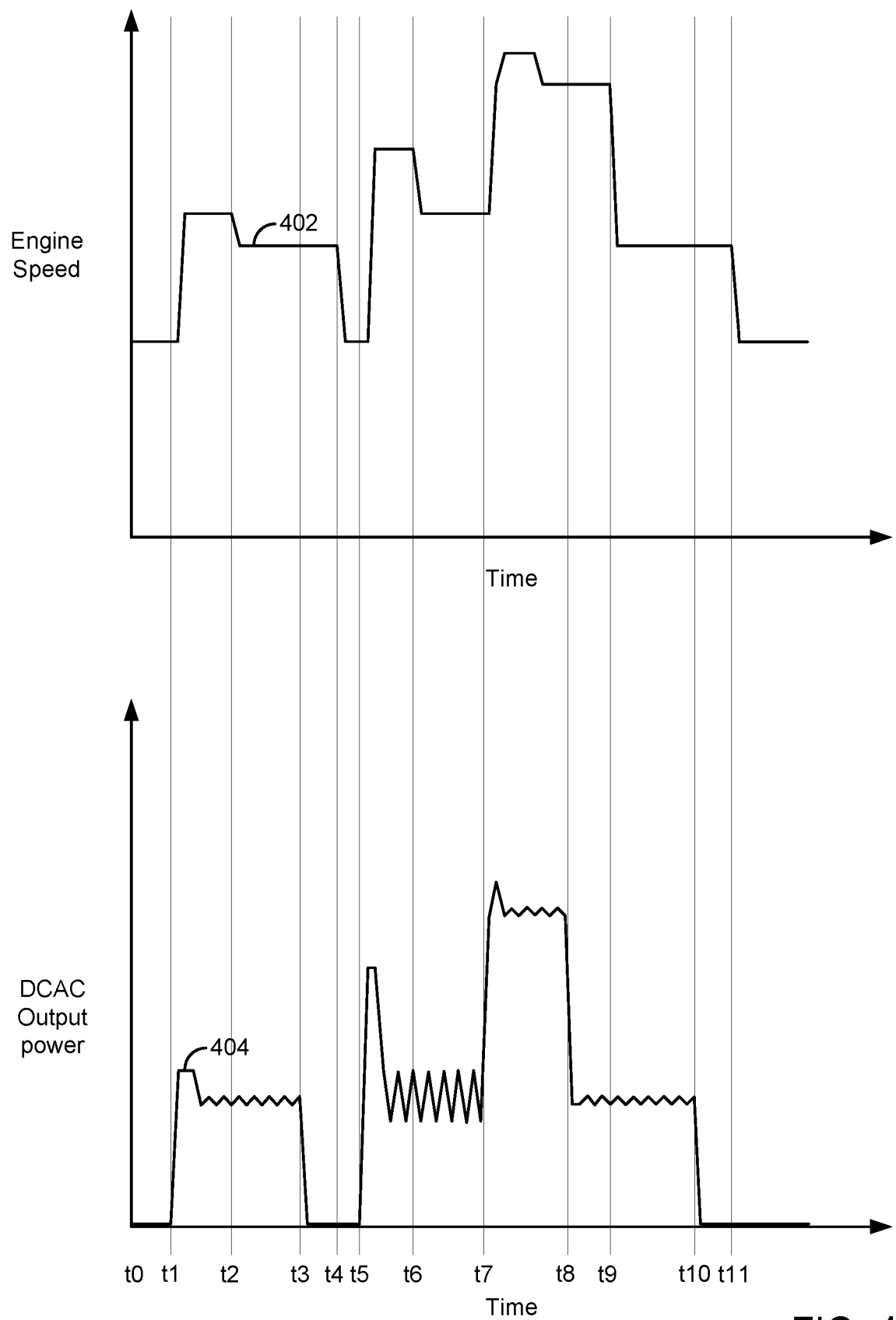
FIG. 4 shows plots of an example engine and alternator operating sequence.

The present description is related to operating a vehicle that includes an engine and an electric machine. The electric machine may be operated to provide electrical power to external alternating current (AC) electrical power consumers. The vehicle may include an engine of the type shown in FIG. 1. The engine and electric machine may be included in a driveline as shown in FIG. 2. A vehicle controller may include a buffer in random access memory as shown in FIGS. 3A and 3B to facilitate the method of FIGS. 5 and 6. The engine and the electric machine may operate as shown in FIG. 4 according to the method of FIGS. 5 and 6.

Figure 1:
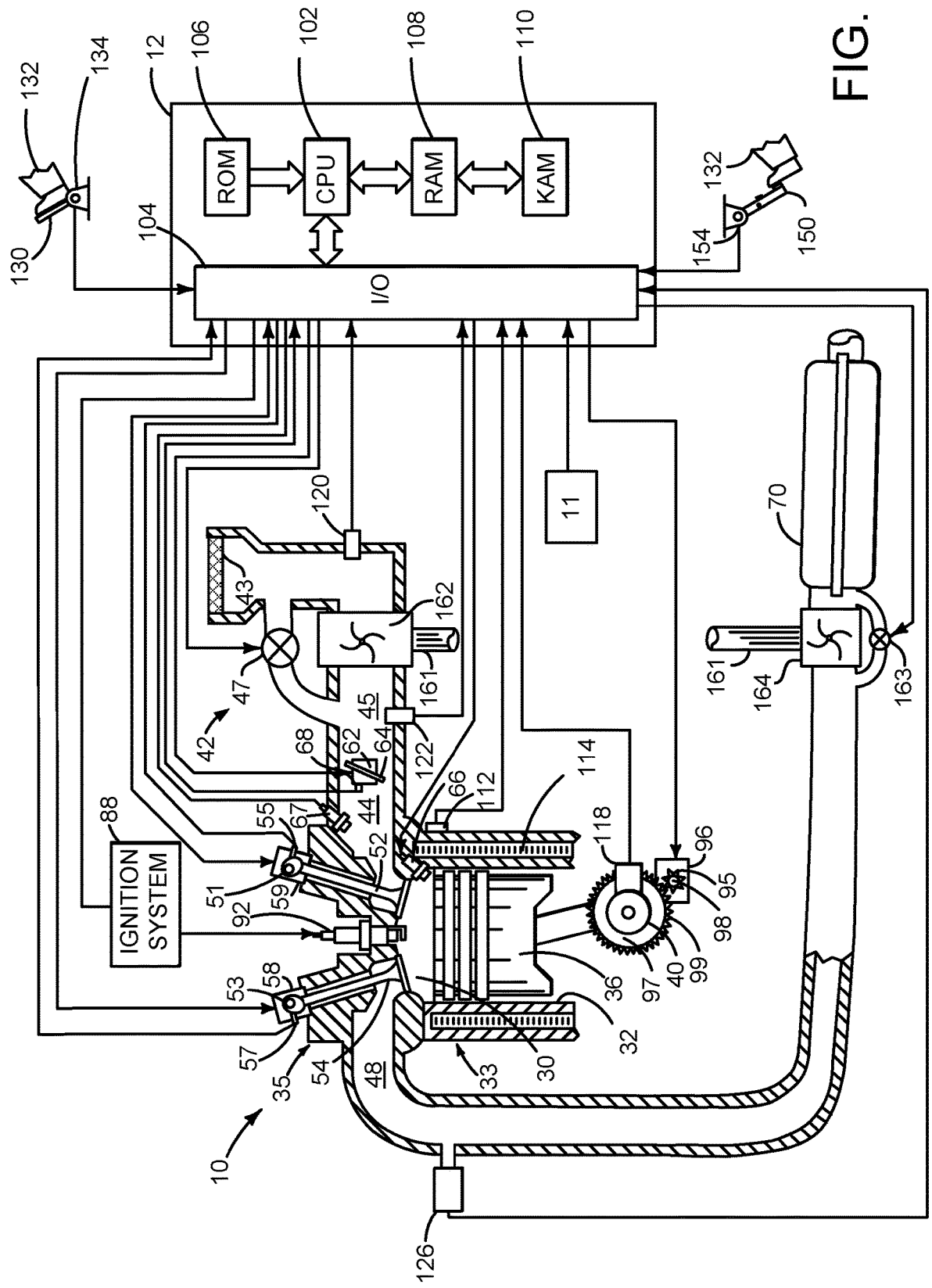
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Vehicle system controller 255 may also determine vehicle operating conditions such as under hood temperature, output power of DCAC converters 287 and 288, and battery SOC via voltage, current, temperature, and pressure sensors 279. Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and/or electric machine 240. Engine 10 may be started via optional engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96 and may receive electrical energy from alternator or belt integrated starter/generator (BISG) 202. BISG 202 is shown coupled to crankshaft 40 via belt 201. Direct current to alternating current (DCAC) converter 287 may receive electrical energy from low voltage battery 280 and/or BISG 202. DCAC 287 may communicate an amount of power that is delivered to outlet receptacle 231 and external alternating current (AC) electrical power consumers 227 to vehicle system controller 255 so that vehicle system controller 255 may command engine controller 12 to provide a requested engine speed and/or torque responsive to the amount of electrical power that is supplied to external AC electrical power consumers 227.

Electric machine 240 may supply alternating current to DCAC 288, and DCAC 288 may supply AC power to external AC electrical power consumers 227 via receptacle 230. External electrical power consumers 227 are located off-board vehicle 225 and they may be provided power when transmission 208 is engaged in park, for example. DCAC 288 may communicate an amount of power that is delivered to outlet receptacle 231 and external AC electrical power consumers 227 to vehicle system controller 255 so that vehicle system controller 255 may command engine controller 12 to provide a requested engine speed and/or torque responsive to the amount of electrical power that is supplied to external AC electrical power consumers 227. AC external electrical power consumers 227 may include but are not limited to tools, entertainment devices, and lighting.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 206 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. Torque converter 206 may multiply torque of ISG 240 to rotate engine 10 when driveline disconnect clutch 236 is fully closed. Thus, the torque of ISG 240 may be increased via torque converter 206 to rotate engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches 211 (e.g., for gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the engine power that flows through torque converter 206 and ISG power is less than a transmission input power limit (e.g., a threshold value not to be exceeded), the power is delivered to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, sensor for determining torque transferred via the transmission clutches, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an electric machine mechanically coupled to the engine; and a controller including executable instructions stored in non-transitory memory to adjust a rotational speed of the engine via a controller responsive to an amount of electrical power output from a direct current to alternating current converter to one or more electric power consumers, and where the rotational speed of the engine is adjusted to a maximum instantaneous engine rotational speed included in a memory buffer that includes a plurality of requested instantaneous engine rotational speeds. The system further comprises additional instructions to filter each of the plurality of requested instantaneous engine rotational speeds via a moving average digital filter. The system further comprises additional instructions to rate limit the maximum instantaneous engine rotational speed. The system further comprises additional instructions to shift values in the memory buffer. The system includes where the values are shifted in a first in to first out order. The system includes where values are shifted in response to a buffer step time expiring.

Referring now to FIG. 3A, a graphic depiction of a memory buffer is shown. In this example, memory buffer 300 includes ten memory locations or cells that are labeled 301-310. The actual total number of memory locations in the memory buffer may be referred to as the actual total number of memory buffer steps. The memory location 301 contains the value of the most recent instantaneous filtered engine speed request and memory location 310 contains the value of the chronologically oldest instantaneous filtered engine speed request that is contained in the memory buffer. In this example, the time step between values in the ten memory locations is five seconds, and the time step may be referred to as the memory buffer time step. Thus, if the entry value in memory location 302 was first placed in the memory buffer at 100 seconds relative to some starting time, then the entry value in memory location 301 occurs at 95 seconds relative to the same starting time. Further, since buffer 300 includes ten entry values stored in ten memory locations, the length of the memory buffer is 10 entries, which corresponds to 50 seconds between the time that the entry value was first installed in memory buffer memory location 301 and the time that the entry value stored in entry 310 was first placed into the memory buffer at memory location 301. This time may be referred to as the buffer time length. The maximum or greatest entry value presently included in memory buffer 300 is 1295 and it is presently stored at memory location 310. Of course, the length of memory buffer 300 may be greater or less than ten memory locations and the buffer step time may be greater or less than 5 seconds without departing from the scope or intent of this disclosure.

Referring now to FIG. 3B, a graphic depiction of the memory buffer 300 shown in FIG. 5 is shown again, except five seconds later in time. In this example, memory buffer 300 also includes ten memory locations or cells that are labeled 301-310. However, the entry value stored in memory location at 301 has been revised to a value of 1245 so that memory location 301 contains the value of the most recent instantaneous filtered engine speed request. In addition, each of the entry values formerly stored in memory locations 301-309 have been shifted to their respective adjacent memory locations. For example, the entry value that was stored in memory location 301 shown in FIG. 3A is now stored in memory location 302. Likewise, the entry value that was stored in memory location 302 shown in FIG. 3A is now stored in memory location 303, and so on. The entry value that was stored in memory location 310 shown in FIG. 3A has been removed from memory buffer 300. Thus, memory buffer 300 follows a first in first out procedure for processing entry values and updating memory buffer 300.

The maximum or greatest entry value now included in memory buffer 300 is 1289, or entry number 304.

Figure 5:
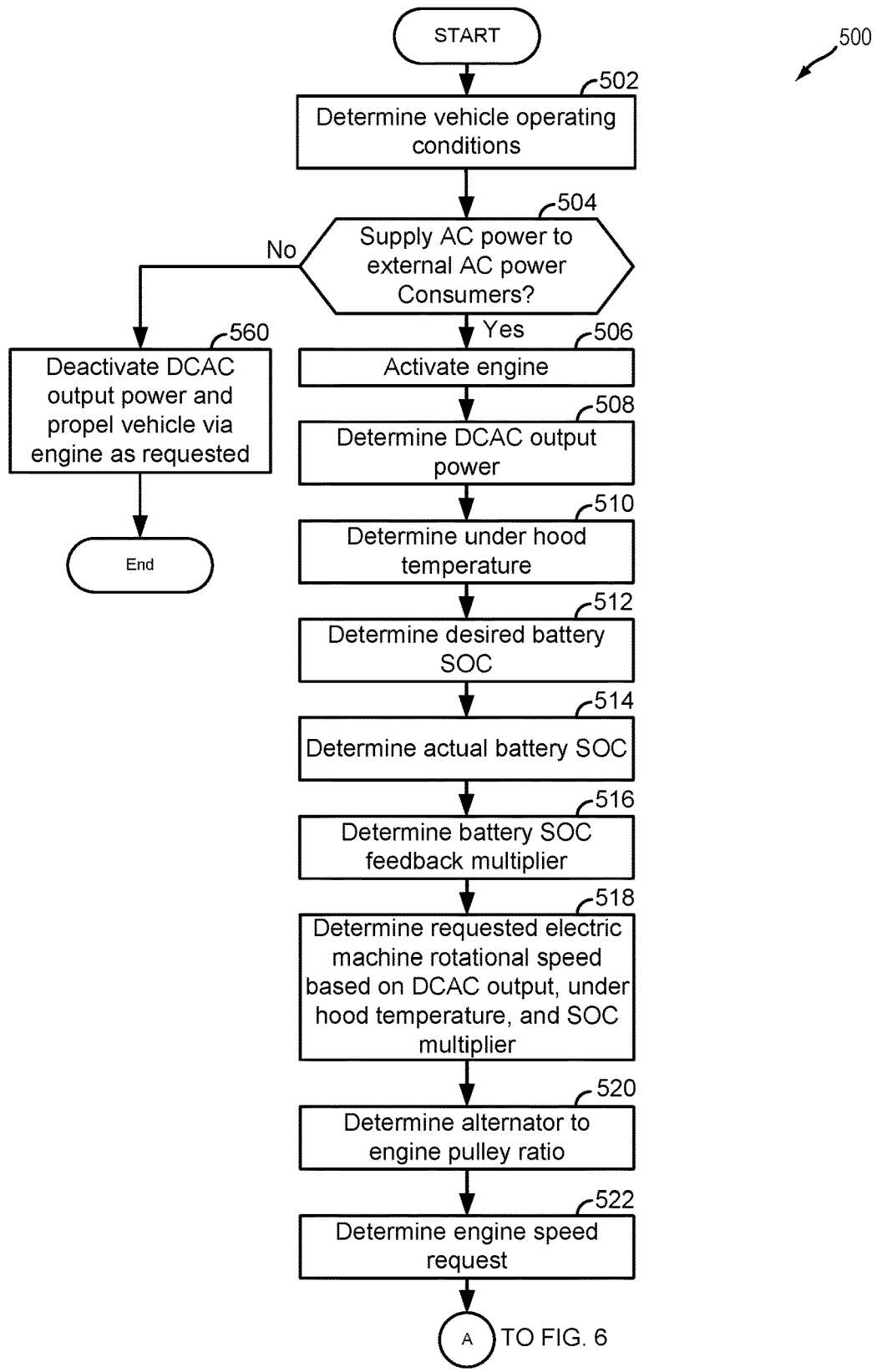
FIGS. 5 and 6 show an example method for operating an engine and an electric machine to supply a requested amount of electrical power from a direct current to alternating current converter to alternating current electrical power consumers is shown.
Figure 6:
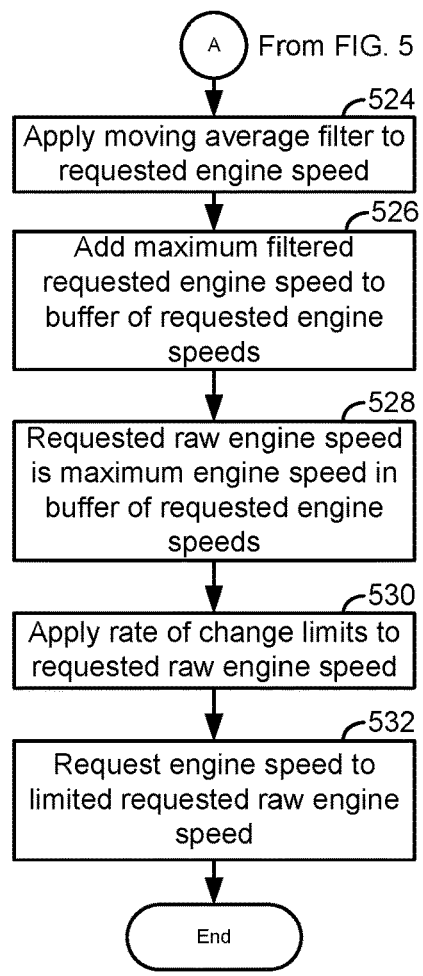

Referring now to FIG. 4, a prophetic sequence that shows how engine speed is controlled according to the method of FIGS. 5 and 6 in cooperation with the system of FIGS. 1 and 2. The plots are aligned in time and occur at a same time. The plots are time aligned and occur at the same time. The vertical lines at t0-t11 show particular times of interest.

The first plot from the top of FIG. 4 is a plot of engine speed versus time. The vertical axis represents the engine speed and engine speed increases in the direction of the vertical axis arrow. The horizontal axis represents time and the time increases from the left side of the figure to the right side of the figure. Trace 402 represents the engine speed.

The second plot from the top of FIG. 4 is a plot of DCAC converter electrical output power versus time. The vertical axis represents the amount of DCAC converter electrical output power and the amount of DCAC converter electrical output power increases in the direction of the vertical axis arrow. The horizontal axis represents time and the time increases from the left side of the figure to the right side of the figure. Trace 404 represents the amount of DCAC converter electrical output power.

At time t0, the engine is operating at idle speed and the DCAC converter electrical power output to external AC electric power consumers is zero. At time t1, the engine is still operating at idle speed and the DCAC converter electrical power output to external AC electric power consumers increases. The amount of DCAC output power increase may be a function of the amount of electrical power consumed by external electrical power consumers. Shortly thereafter, engine speed is increased so that the engine's torque capacity is increased, thereby allowing alternator or BISG output to increase to meet or exceed DCAC converter electrical power output. The increased engine torque capacity allows the engine to generate power that is sufficient to increase alternator output to meet the power consumption of the external AC electric power consumers. The engine speed is increased shortly after the DCAC converter output is increased and the battery supplies power to the DCAC when engine power and alternator or BISG electrical output power is insufficient to meet DCAC converter electrical output power (not shown). The amount of electrical power that is output by the DCAC converter and consumed by the external AC electric power consumers increases and then it decreases shortly thereafter.

At time t2, the engine speed is reduced since the amount of electrical power that is output by the DCAC converter and consumed by the external AC electric power consumers was previously decreased just after time t1. The decrease in engine speed may allow the engine to operate while consuming less fuel. At time t3, the amount of electrical power that is output by the DCAC converter and consumed by the external AC electric power consumers is decreased toward zero. However, the engine speed continues on without changing. At time t4, engine speed is reduced further and goes to idle speed shortly thereafter in response to the electrical output of the DCAC converter and the amount of electrical power consumed by the external AC electric power consumers decreasing at time t3. The amount of electrical power that is output via the DCAC converter and consumed by the external AC electric power consumers increases at time t5 and the engine speed is increased shortly thereafter so that output of the alternator may meet or exceed the output of the DCAC converter. The amount of electrical power output by the DCAC converter and consumed by the external AC electric power consumers decreases shortly after time t5. Nevertheless, the engine speed is not decreased until time t6 because the memory buffer contains a maximum instantaneous filtered engine speed request corresponding to the instantaneous filtered engine speed requested shortly after time t5. At time t6, the maximum instantaneous filtered engine speed request contained in the memory buffer is decreased causing the engine speed to be reduced.

The DCAC converter electrical output power increases and decreases between time t6 and time t7; however, the engine speed is sufficiently high that the engine may provide power that is sufficient to meet the DCAC converter output power. At time t7, the amount of electrical power output by the DCAC converter and consumed by the external AC electric power consumers increases. Shortly thereafter, the engine speed is increased so that engine output power is sufficient to drive the alternator that supplies electrical power to the DCAC converter and the external AC electric power consumers. At time t8, the amount of electrical power that is output by the DCAC converter and consumed by the external AC electric power consumers is decreased to a lower level. Nevertheless, the engine speed continues on without being reduced due to the maximum instantaneous filtered engine speed request that is stored in the memory buffer. At time t9, engine speed is reduced, but it remains above idle speed so that the engine may output power that is sufficient to meet the output of the DCAC converter. The engine speed is reduced in response to the maximum instantaneous filtered engine speed request value decreasing.

At time t10, the electrical output of the DCAC converter and the amount of electrical power consumed by the external AC electric power consumers is decreased again. However, the engine speed remains unchanged from engine speed shortly after time t9. The engine speed remains unchanged until time t11, at which time the maximum instantaneous filtered engine speed request decreases.

In this way, an engine speed request may be processed via a memory buffer so that engine speed may change with less frequency to avoid the possibility of annoying people that may be in the vicinity of the vehicle while the vehicle is supplying electrical power to external AC power consumers. Notably, engine speed may be elevated while a maximum instantaneous filtered engine speed request is unchanged and stored in a memory buffer. The engine speed may be decreased once the value of the maximum instantaneous filtered engine speed request contained within the memory buffer is purged from the memory buffer.

Referring now to FIGS. 5 and 6, a flow chart of a method for operating a vehicle engine is shown. The method may reduce the possibility of frequent engine speed changes while the engine supplies power to a DCAC converter via an alternator or other electric machine. The method of FIGS. 4 and 5 may be incorporated into and may cooperate with the system of FIGS. 1 and 2. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to engaged transmission gear, operating state of DCAC converter (e.g., activated or deactivated), engine temperature, ambient temperature, vehicle speed, electric machine operating state (e.g., activated or deactivated), electric machine temperature, amount of electric power output from the DCAC, electric machine speed, engine speed, engine load, engine temperature, and electric energy storage device state of charge (SOC). Method 500 may determine the vehicle operating conditions via the system described in FIGS. 1 and 2. Method 500 proceeds to 504.

At 504, method 500 judges if AC electrical power is to be supplied to external AC electrical power consumers. In one example, AC electrical power may be supplied to external AC electrical power consumers in response to a request to deliver AC electrical power to the external AC electrical power consumers. In one example, the request to deliver AC electrical power to the external AC electrical power consumers may be input via a human/machine interface. Further, method 500 may require select vehicle operating conditions before AC electrical power may be delivered to AC electrical power consumers. For example, method 500 may require that the vehicle's transmission is engaged in park, that engine temperature is less than a threshold temperature, and that an amount of oil in the engine is greater than a threshold amount. If method 500 judges that AC electrical power is to be supplied to external AC electrical power consumers, the answer is yes and method 500 proceeds to 506. Otherwise, method 500 proceeds to 560.

At 560, method 500 deactivates the DCAC and ceases to supply electrical power to external AC power consumers. Method 500 may also propel the vehicle on a road via the vehicle's engine. Method 500 proceeds to exit.

At 506, method 500 may activate the vehicle's engine if the engine is not already activated so that the engine may supply power to an electrical machine that supplies electrical power to the DCAC. The engine may be activated via supplying fuel and spark to the engine. The engine begins to combust the fuel when it is activated. Method 500 proceeds to 508.

At 508, method 500 determines electrical output of the DCAC converter. The DCAC converter may communicate its electrical output power to the vehicle system controller. Method 500 proceeds to 510.

At 510, method 500 determines a temperature of the vehicle (e.g., under hood temperature). Method 500 may determine the vehicle temperature via a temperature sensor. Method 500 proceeds to 512.

At 512, method 500 determines a desired battery state of charge (SOC). In one example, the desired battery state of charge may be stored in controller memory and it may be referenced via ambient temperature. Method 500 may determine the desired battery state of charge via referencing a table or function stored in controller non-transitory memory. Method 500 proceeds to 514 after determining the desired battery state of charge.

At 514, method 500 determines the actual battery state of charge. In one example, the actual battery state of charge may be estimated based on battery voltage and coulomb counting. Method 500 proceeds to 516 after determining the actual battery state of charge.

At 516, method 500 determines a battery state of charge feedback multiplier. In one example, the battery state of charge feedback multiplier may be determined via referencing or indexing a function or table that outputs an empirically determined battery state of charge feedback multiplier. The values stored in the table or function may be determined via operating the vehicle monitoring the battery SOC and adjusting the multiplier values until battery SOC is equal to the desired SOC within a predetermined amount of time. Further, the values stored in the table or function may be indexed or referenced via the difference between desired SOC minus actual SOC. In one example, the SOC feedback multiplier is a value less than one (e.g., 0.95) when actual SOC is greater than desired SOC and the SOC feedback multiplier may be a value that is greater than one (e.g., 1.05) when actual SOC is less than desired SOC. Method 500 proceeds to 518.

At 518, method 500 determines a requested instantaneous electric machine speed (e.g., a desired alternator, ISG, or BISG speed) in response to DCAC output electric power, under hood temperature, and the SOC multiplier. In one example, a relationship between DCAC electrical power output and electric machine speed is referenced via the DCAC electrical power output divided by DCAC efficiency (e.g., 1000 Watts/0.92). The requested instantaneous electric machine speed is further adjusted in response to the SOC feedback multiplier. The requested instantaneous electric machine speed may be expressed via the following equation:

$$N\_elec\_mach = f(DCAC\_out/DCAC\_eff) \cdot g(Under\_temp) \cdot SOC\_mult$$

where N_elec mach is the requested electric machine rotational speed, f is a function that returns a requested electric machine rotational speed, DCAC_eff is an efficiency of the DCAC converter, g is a function that returns a multiplier value, Under temp is a vehicle under hood temperature, and SOC_mult is the SOC multiplier determined at 516. Method 500 proceeds to 520 after determining the requested instantaneous electric machine speed (e.g., the requested speed for the alternator, ISG, or BISG to provide power to the DCAC).

At 520, method 500 determines an alternator or BISG to engine pulley ratio. In one example, the alternator or BISG to engine pulley ratio is stored in controller non-transitory memory and retrieved by the controller. Method 500 proceeds to 522.

At 522, method 500 determines an instantaneous engine speed request. In one example, the instantaneous engine speed request is determined by multiplying the requested instantaneous electric machine speed by the alternator or BISG to engine pulley ratio. However, if the ISG is providing electrical power to the DCAC, then the instantaneous engine speed request is equal to the requested instantaneous electric machine speed. Method 500 proceeds to 524.

At 524, method 500 applies a moving average filter to the requested instantaneous engine speed. In one example, the moving average filter may be expressed as:

$$Filt\_req\_inst\_eng\_spd = Req\_inst\_eng\_spd(k) + Req\_inst\_eng\_spd(k-1)/2$$

where Filt_req_inst_eng_spd is the moving average filtered requested instantaneous engine speed, Req_inst_eng _spd is the requested instantaneous engine speed, and k is the sample number. This example describes the moving average filtered requested instantaneous engine speed as being an average of two values of the requested instantaneous engine speed; however, the moving average filtered requested instantaneous engine speed may be determined via two or more values of the requested instantaneous engine speed. Method 500 proceeds to 526.

At 526, method 500 shifts all values stored in a buffer to a next location in the buffer. For example, as described in FIGS. 3A and 3B, the value stored in memory location 301 is moved to memory location 302, the value stored in memory location 302 is moved to memory location 303, and so on until the value stored in the last memory location of the buffer (e.g., 310 of FIG. 3A) is discarded. Method 500 also stores in a first memory location or cell of a memory buffer a maximum value of the filtered requested instantaneous engine speed that has occurred during a most recent buffer step time. Thus, if the buffer time step is 5 seconds, then the greatest value of the filtered requested instantaneous engine speeds that occurred during the buffer time step is input to the first memory location of the buffer (e.g., location 301 shown in FIG. 3A). The operation of step 526 is performed each time the buffer time step expires (e.g., each time the buffer time step counts from a value of zero seconds to a value of five seconds, where the buffer time step is five seconds). Of course the buffer time step may take on different values for different applications. For example, in some applications, the buffer time step may be ten seconds. Method 500 proceeds to 528.

At 528, method 500 determines the maximum value of the plurality of filtered requested instantaneous engine speeds to determine a requested raw instantaneous engine speed. Method 500 proceeds to 530 after determining the requested raw instantaneous engine speed.

At 530, method 500 applies unique positive and negative rate limits to the requested raw instantaneous engine speed. For example, method 500 may allow the requested raw instantaneous engine speed to increase by 700 RPM/second and method 500 may allow the requested raw instantaneous engine speed to decrease by 300 RPM/second. By allowing the requested raw instantaneous engine speed to increase faster than it decreases, method 500 allows the engine speed to quickly increase to a level where engine power may be used to supply power to external AC electric power consumers. Further, by lowering the rate that engine speed may be decreased, it may be possible to reduce engine speed oscillations and gradually move the engine to operating conditions with lower fuel consumption. The requested raw engine speed is now a limited requested raw engine speed. Method 500 proceeds to 532.

At 532, method 500 requests and controls engine speed to the limited requested raw engine speed. The engine speed may be adjusted via adjusting a position of a torque actuator such as a throttle, fuel injector, cam timing, or spark timing. Method 500 proceeds to exit.

Thus, the method of FIGS. 5 and 6 provides for a powertrain operating method, comprising: propelling a vehicle via an engine; storing a plurality of requested instantaneous engine rotational speed values in a memory buffer via a controller, the memory buffer including a plurality of unique memory locations, each of the plurality of unique memory locations including one of the plurality of requested instantaneous engine rotational speed values; shifting at least one of the plurality of requested instantaneous engine rotational speed values from a first of the unique memory locations to a second of the unique memory locations in response to a buffer step time expiring; and adjusting engine rotational speed to a maximum requested instantaneous engine rotational speed value stored in the buffer via the controller. The method further comprises determining the plurality of requested instantaneous engine speed values from a plurality of requested instantaneous electric machine speed values.

In some examples, the method includes where the requested instantaneous electric machine speed values are a function of an amount of electric power consumed via external electric power consumers. The method includes where the external electric power consumers are off-board of a vehicle and where the engine is on-board a vehicle. The method further comprises adjusting the engine rotational speed via an engine torque actuator. The method further comprises applying a moving average filter to the plurality of requested instantaneous engine rotational speed values. The method further comprises shifting a new requested instantaneous engine rotational speed value into one of the plurality of unique memory locations in response to the buffer step time expiring. The method further comprises shifting one of the plurality of requested instantaneous engine rotational speed values out of the plurality of unique memory locations in response to the buffer step time expiring.

The method of FIGS. 5 and 6 provides for a powertrain operating method, comprising: propelling a vehicle via an engine; and adjusting a rotational speed of the engine via a controller responsive to an amount of electrical power output from a direct current to alternating current converter to one or more electric power consumers, and where the rotational speed of the engine is adjusted to a maximum instantaneous engine rotational speed included in a memory buffer that includes a plurality of requested instantaneous engine rotational speeds. The method includes where the plurality of requested instantaneous engine rotational speeds are stored in the memory buffer responsive to a buffer time length. The method includes where the memory buffer stores one of the plurality of requested instantaneous engine rotational speeds for a predetermined buffer time duration. The method includes where a predetermined buffer step time separates each value of the plurality of requested instantaneous engine rotational speeds stored in the memory buffer. The method further comprises rate limiting the rotational speed of the engine. The method includes where the rate limiting includes reducing a rate of lowering the rotational speed of the engine to less than a threshold.

In another representation, the present method provides for s powertrain operating method, comprising: propelling a vehicle via an engine; adjusting a rotational speed of the engine via a controller responsive to an amount of electrical power output from a direct current to alternating current converter to one or more electric power consumers, where the rotational speed of the engine is adjusted to a maximum instantaneous engine rotational speed included in a memory buffer that includes a plurality of requested instantaneous engine rotational speeds; and where the memory buffer includes a predetermined actual total number of memory cells or locations that receive updated values at a predetermined time interval. The method includes where the predetermined time interval is a buffer step time. The method also includes commanding an engine speed to a requested maximum instantaneous engine speed an entire amount of time that the requested instantaneous engine speed request is located in the memory buffer.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, 13, 14, 15, V6, V8, V10, and V12 engines operating in natural gas, gasoline, diesel, or alternative fuel configurations could use the present description to advantage.

The invention claimed is:

1. A powertrain operating method, comprising:
propelling a vehicle via an engine;
storing a plurality of requested instantaneous engine rotational speed values in a memory buffer via a controller, the memory buffer including a plurality of unique memory locations, each of the plurality of unique memory locations including one of the plurality of requested instantaneous engine rotational speed values;
shifting at least one of the plurality of requested instantaneous engine rotational speed values from a first of the unique memory locations to a second of the unique memory locations in response to a buffer step time expiring; and
adjusting an engine rotational speed to a maximum requested instantaneous engine rotational speed value stored in the memory buffer via the controller.

2. The powertrain operating method of claim 1, further comprising determining the plurality of requested instantaneous engine speed values from a plurality of requested instantaneous electric machine speed values.

3. The powertrain operating method of claim 2, where the requested instantaneous electric machine speed values are a function of an amount of electric power consumed via external electric power consumers.

4. The powertrain operating method of claim 3, where the external electric power consumers are off-board of a vehicle and where the engine is on-board the vehicle.

5. The powertrain operating method of claim 1, further comprising adjusting the engine rotational speed via an engine torque actuator.

6. The powertrain operating method of claim 1, further comprising applying a moving average filter to the plurality of requested instantaneous engine rotational speed values.

7. The powertrain operating method of claim 1, further comprising shifting a new requested instantaneous engine rotational speed value into one of the plurality of unique memory locations in response to the buffer step time expiring.

8. The powertrain operating method of claim 7, further comprising shifting one of the plurality of requested instantaneous engine rotational speed values out of the plurality of unique memory locations in response to the buffer step time expiring.

9. A powertrain operating method, comprising:
propelling a vehicle via an engine; and
adjusting a rotational speed of the engine via a controller responsive to an amount of electrical power output from a direct current to alternating current converter to one or more electric power consumers, and where the rotational speed of the engine is adjusted to a maximum instantaneous engine rotational speed included in a memory buffer that includes a plurality of requested instantaneous engine rotational speeds;
where a predetermined buffer step time separates each value of the plurality of requested instantaneous engine rotational speeds stored in the memory buffer.

10. The powertrain operating method of claim 9, where the plurality of requested instantaneous engine rotational speeds are stored in the memory buffer responsive to a buffer time length.

11. The powertrain operating method of claim 10, where the memory buffer stores one of the plurality of requested instantaneous engine rotational speeds for a predetermined buffer time duration.

12. The powertrain operating method of claim 9, further comprising rate limiting the rotational speed of the engine.

13. The powertrain operating method of claim 12, where the rate limiting includes reducing a rate of lowering the rotational speed of the engine to less than a threshold.

14. A system, comprising:
an engine;
an electric machine mechanically coupled to the engine; and
a controller including executable instructions stored in non-transitory memory to adjust a rotational speed of the engine via the controller responsive to an amount of electrical power output from a direct current to alternating current converter to one or more electric power consumers, and where the rotational speed of the engine is adjusted to a maximum instantaneous engine rotational speed included in a memory buffer that includes a plurality of requested instantaneous engine rotational speeds;
the controller further comprising additional instructions to filter each of the plurality of requested instantaneous engine rotational speeds via a moving average digital filter.

15. The system of claim 14, further comprising additional instructions to rate limit the maximum instantaneous engine rotational speed.

16. The system of claim 14, further comprising additional instructions to shift values in the memory buffer.

17. The system of claim 16, where the values are shifted in a first in to first out order.

18. The system of claim 17, where values are shifted in response to a buffer step time expiring.

* * * * *